(12) United States Patent
Ott et al.

(10) Patent No.: US 9,915,480 B2
(45) Date of Patent: Mar. 13, 2018

(54) TUBE ASSEMBLY

(71) Applicant: United Technologies Corporation, Hartford, CT (US)

(72) Inventors: Joe Ott, Enfield, CT (US); John J. Rup, Jr., Willington, CT (US); Stanley J. Funk, Southington, CT (US); Dennis M. Moura, South Windsor, CT (US); Lyutsia Dautova, Rocky Hill, CT (US); Roger O. Coffey, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 231 days.

(21) Appl. No.: 14/789,496

(22) Filed: Jul. 1, 2015

(65) Prior Publication Data

US 2016/0003556 A1 Jan. 7, 2016

Related U.S. Application Data

(60) Provisional application No. 62/020,613, filed on Jul. 3, 2014.

(51) Int. Cl.
| | |
|---|---|
| *F16L 9/18* | (2006.01) |
| *F28F 1/00* | (2006.01) |
| *F23R 3/28* | (2006.01) |
| *F16L 59/14* | (2006.01) |

(52) U.S. Cl.
CPC ............... *F28F 1/00* (2013.01); *F23R 3/283* (2013.01); *F16L 9/18* (2013.01); *F16L 59/14* (2013.01); *F23D 2211/00* (2013.01); *F23D 2900/00016* (2013.01)

(58) Field of Classification Search
CPC ..... F16L 9/18; F16L 9/19; F16L 59/13; F16L 59/123; F16L 39/005
USPC .......................... 138/112–114, 148; 165/177
See application file for complete search history.

(56) References Cited

U.S. PATENT DOCUMENTS

| | | | | |
|---|---|---|---|---|
| 2,194,886 | A | * | 3/1940 | Dallenbach ............... H01J 5/26 |
| | | | | 174/152 GM |
| 2,475,635 | A | * | 7/1949 | Parsons ..................... F16L 9/18 |
| | | | | 123/198 R |
| 3,648,734 | A | * | 3/1972 | Waite ...................... F16L 59/08 |
| | | | | 138/113 |

(Continued)

OTHER PUBLICATIONS

EP search report for EP 15175177 dated Nov. 3, 2015.

*Primary Examiner* — Patrick F Brinson
(74) *Attorney, Agent, or Firm* — O'Shea Getz P.C.

(57) ABSTRACT

A tube assembly that may be for a fuel nozzle of a fuel system of a gas turbine engine may have a first tube defining a first flowpath along a centerline, a second tube generally spaced radially outward from the first tube with a first void located between and defined by the first and second tubes, and a support structure located in the first void and extending between the first and second tubes. The support structure is constructed and arranged to minimize or eliminate thermal conduction between the tubes. The entire assembly may be additive manufactured as one unitary piece. One example of a method of operation may include designed-for breakage of the structural support due to then al stresses thereby further minimizing thermal conduction between tubes.

17 Claims, 5 Drawing Sheets

(56) References Cited

U.S. PATENT DOCUMENTS

| | | | | |
|---|---|---|---|---|
| 3,785,407 | A | * | 1/1974 | Waite ................... F16L 59/13 |
| | | | | 138/108 |
| 4,098,476 | A | * | 7/1978 | Jutte ..................... F16B 4/004 |
| | | | | 138/108 |
| 4,250,927 | A | * | 2/1981 | Newburg ................ F16L 7/00 |
| | | | | 138/113 |
| 4,253,792 | A | * | 3/1981 | Nishikawa ............ B65B 17/02 |
| | | | | 138/109 |
| 4,415,184 | A | * | 11/1983 | Stephenson ............ E21B 17/00 |
| | | | | 138/149 |
| 5,125,691 | A | * | 6/1992 | Bogdan .................. E21B 17/18 |
| | | | | 138/113 |
| 5,992,468 | A | * | 11/1999 | Dwiggins ............. E21B 17/206 |
| | | | | 138/108 |
| 6,038,862 | A | * | 3/2000 | Melman ................. F23D 11/36 |
| | | | | 431/114 |
| 6,276,141 | B1 | | 8/2001 | Pelletier |
| 6,715,292 | B1 | | 4/2004 | Hoke |
| 7,007,864 | B2 | | 3/2006 | Snyder et al. |
| 7,481,248 | B2 | | 1/2009 | Prociw et al. |
| 8,689,563 | B2 | | 4/2014 | Low |
| 8,733,078 | B2 | | 5/2014 | Alholm |
| 8,973,368 | B2 | | 3/2015 | Dai et al. |
| 9,068,751 | B2 | | 6/2015 | Snyder |
| 9,115,897 | B2 | | 8/2015 | Snyder et al. |
| 2002/0073708 | A1 | | 6/2002 | Lavie et al. |
| 2006/0231150 | A1 | * | 10/2006 | Jamison ................ F16L 59/143 |
| | | | | 138/114 |
| 2009/0200275 | A1 | | 8/2009 | Twelves, Jr. et al. |
| 2011/0247590 | A1 | | 10/2011 | Donovan |
| 2014/0182292 | A1 | | 7/2014 | Hudon et al. |
| 2015/0003997 | A1 | | 1/2015 | Mironets et al. |

\* cited by examiner

TUBE ASSEMBLY

This application claims priority to U.S. patent application Ser. No. 62/020,613 filed Jul. 3, 2014.

BACKGROUND

The present disclosure relates to a tube assembly, and more particularly to an additive manufactured tube assembly.

Manufacturing of tube assemblies such as those containing tubes within tubes (or concentrically located tubes), as one example, require the manufacture of several individual parts then assembly to create the final product. In some examples, air within an annular void defined between the two concentrically located tubes acts as a thermal insulator for fluid that may be flowing through the inner tube. Sealing of this void (i.e. complete encapsulation) to enhance the thermal properties of the surrounding air is difficult from a manufacturing perspective and not typically accomplished, and if such were accomplished, it would require yet further parts thus limiting feasibility. Similarly, concentrically located tube may require support structures to maintain orientation between the tubes, such structures are intricate and difficult to manufacture. Moreover structures connecting the tubes will contribute toward unwanted thermal conduction between tubes.

Furthermore, there exist needs in various industries to reduce the number of manufactured parts for tube or conduit-like assemblies, thereby providing more robust and simpler designs requiring less maintenance, reducing manufacturing time and costs, improving thermal barrier characteristics, and/or reducing thermal conduction paths between inner and outer tubes of the assemblies, amongst others.

SUMMARY

A tube assembly according to one, non-limiting, embodiment includes a first tube defining a first flowpath along a centerline; a second tube generally spaced radially outward from the first tube, and wherein a first void is located between and defined by the first and second tubes; and a first sacrificial support structure located in the first void and extending between the first and second tubes that is constructed and arranged to break when under normal operating stress thereby limiting thermal conduction between the first and second tubes.

Additionally to the foregoing embodiment, the first tube, the second tube and the support structure are additive manufactured as one unitary piece.

In the alternative or additionally thereto, in the foregoing embodiment, the first void is an insulating void.

In the alternative or additionally thereto, in the foregoing embodiment, the assembly includes a third tube generally spaced radially outward from the second tube, and wherein a second flowpath is located between and defined by the third and second tubes.

In the alternative or additionally thereto, in the foregoing embodiment, the assembly includes a fourth tube generally spaced radially outward from the third tube, and wherein a second void is located between and defined by the fourth and third tubes.

In the alternative or additionally thereto, in the foregoing embodiment, the assembly includes a second sacrificial support structure located in the second void.

In the alternative or additionally thereto, in the foregoing embodiment, the second void is an insulating void.

In the alternative or additionally thereto, in the foregoing embodiment, the first void is under a negative atmospheric pressure.

In the alternative or additionally thereto, in the foregoing embodiment, the first and second cavities are under a negative atmospheric pressure.

In the alternative or additionally thereto, in the foregoing embodiment, the sacrificial support structure has a thickness within a range of 0.004 to 0.008 inches.

In the alternative or additionally thereto, in the foregoing embodiment, the assembly includes a second sacrificial support structure located in the second flowpath.

In the alternative or additionally thereto, in the foregoing embodiment, the tube assembly is at least part of a fuel nozzle for a gas turbine engine.

A tube assembly according to another, non-limiting, embodiment includes a first tube defining a first flowpath along a centerline; a second tube generally spaced radially outward from the first tube by a radial distance, and wherein a first void is located between and defined by the first and second tubes; and a first support structure located in the first void, and extending between and engaged to the first and second tubes, and wherein the support structure has a length greater than the radial distance for minimizing thermal conduction between the first and second tubes.

Additionally to the foregoing embodiment, the support structure substantially lies with an imaginary axial plane with respect to the centerline and has at least one bend.

In the alternative or additionally thereto, in the foregoing embodiment, the first support structure is one of a plurality of first support structures spaced circumferentially from one-another.

In the alternative or additionally thereto, in the foregoing embodiment, the first support structure extends both axially and radially inward from the second tube to the first tube.

In the alternative or additionally thereto, in the foregoing embodiment, the assembly includes a third tube generally spaced radially outward from the second tube, and wherein a second flowpath is located between and defined by the third and second tubes; a fourth tube generally spaced radially outward from the third tube, and wherein a second void is located between and defined by the fourth and third tubes; and a second support structure located in the second void.

In the alternative or additionally thereto, in the foregoing embodiment, the tube assembly is additive manufactured as one unitary piece.

A method of operating a fuel system of a gas turbine engine according to another, non-limiting, embodiment includes the steps of flowing a first fluid through a first flowpath defined by a first tube; exposing a second tube surrounding and spaced radially outward from the first tube to a first thermal gradient; and breaking a first sacrificial support structure located between the first and second tubes via thermal stress induced by the first thermal gradient.

Additionally to the foregoing embodiment, the method includes the steps of flowing a second fluid through an annular second flowpath defined between the second tube and a third tube that is spaced from the second tube; exposing the third tube to a second thermal gradient; and breaking a second sacrificial support structure located between the second and third tubes via thermal stress induced by the second thermal gradient.

The foregoing features and elements may be combined in various combinations without exclusivity, unless expressly indicated otherwise. These features and elements as well as the operation thereof will become more apparent in-light of the following description and the accompanying drawings. It should be understood; however, that the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
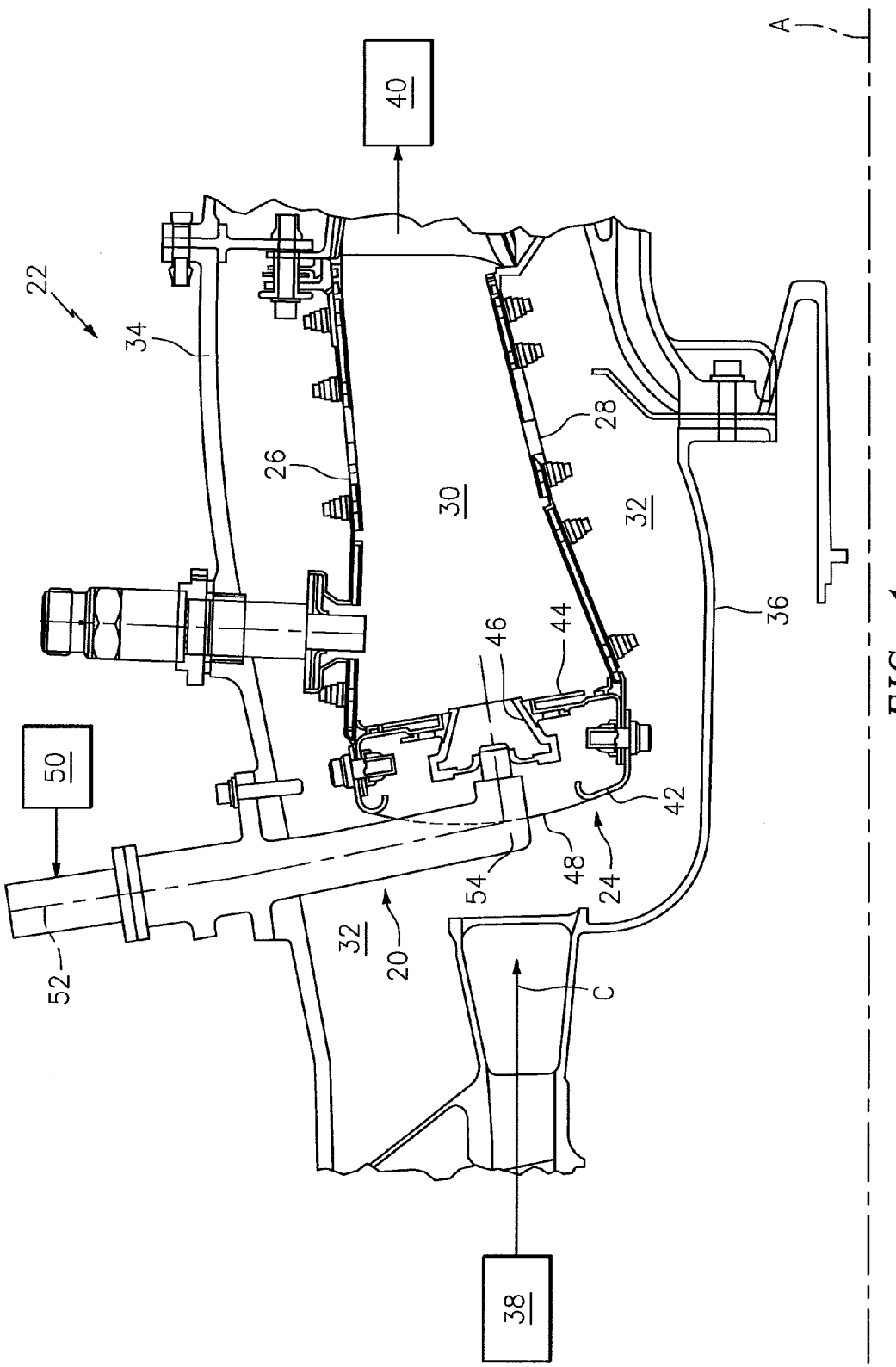
FIG. 1 is a cross section of a combustor of a gas turbine engine illustrating a fuel nozzle as an example of a tube assembly of the present disclosure.

FIG. 1 illustrates a fuel nozzle for a gas turbine engine as one, non-limiting, example of a tube assembly 20. The fuel nozzle 20 is part of a combustor 22 that may be annular in shape and concentrically disposed to an engine axis A. The combustor 22 may further include a bulkhead assembly 24, an outer wall 26, an inner wall 28, and a diffuser case module 34. The outer and inner walls 26, 28 project axially in a downstream direction from the bulkhead assembly 24, and radially define an annular combustion chamber 30 therebetween. An annular cooling plenum 32 is generally defined radially between the outer diffuser case module 34 and a diffuser inner case 36 of the engine. The bulkhead assembly 24 and walls 26, 28 are located in the cooling plenum 32 immediately downstream from a compressor section 38, and upstream from a turbine section 40 of the engine.

The annular bulkhead assembly 24 may extend radially between and is secured to the forward most ends of the walls 26, 28. Assembly 24 generally includes an annular hood 42, a wall or heat shield 44 that defines the axial upstream end of the combustion chamber 30, and a plurality of swirlers 46 (one shown) spaced circumferentially about engine axis A and generally projecting or communicating through the wall 44. A plurality of circumferentially distributed hood ports 48 accommodate a respective plurality of the fuel injectors or nozzles 20 as well as direct compressed air C into the forward end of the combustion chamber 30 through the associated swirler 46.

The bulkhead assembly 24 introduces core combustion air into the upstream end of the combustion chamber 30 while dilution and cooling air is introduced into the combustion chamber 30 through the walls 26, 28 and from the plenum 32. The plurality of fuel nozzles 20 and respective swirlers 46 facilitate the generation of a blended fuel-air mixture that supports combustion in the combustion chamber 30.

Each fuel nozzle 20 may receive fuel from at least one fuel manifold 50 generally located radially outward of the case module 34. The elongated fuel nozzle 20 may substantially extend longitudinally along a centerline 52 and in a radial inward direction with respect to the engine axis A, through the case module 34 and into the plenum 32. The centerline 52 and thus the nozzle 20 may then bend (i.e. see bend 54) and thus project in an axial downstream direction, extending through the hood port 48 and into the swirler 46 where fuel is then dispensed and atomized from the nozzle 20.

Figure 2:
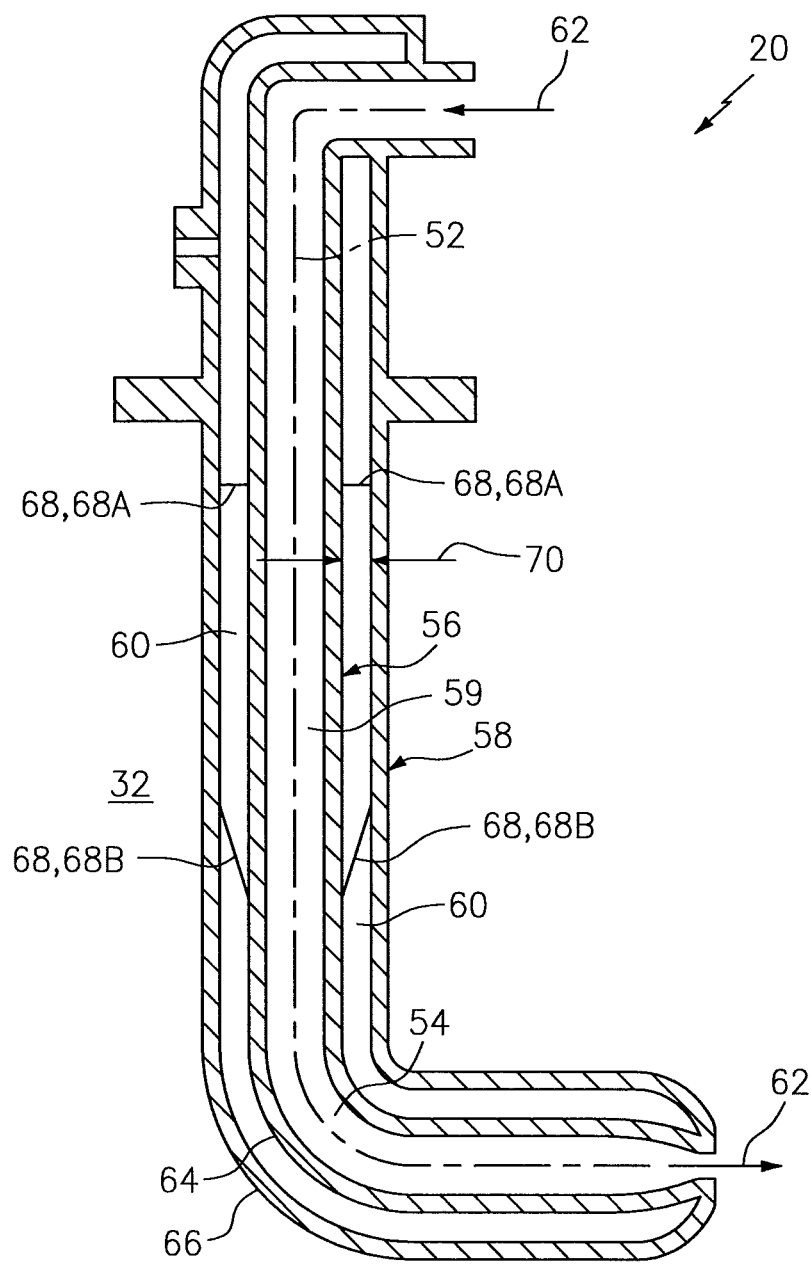
FIG. 2 is a cross section of the tube assembly.

Referring to FIG. 2, the tube assembly 20 (i.e. a simplified fuel nozzle in the present example) may have a first or inner tube 56 co-extending with and surrounded by (e.g. concentrically located) a second or outer tube 58. The inner tube 56 may define a flowpath 59 for the flow of a fluid such as liquid fuel. The outer tube 58 may be spaced radially outward from the inner tube 56 thereby defining a substantially annular void 60, there-between. Void 60 may generally be sealed (i.e. completely encapsulated) from the plenum 32 and/or surrounding environment to act as a thermal insulator for any fluid (see arrow 62) flowing through the inner tube 56. To enhance the thermal insulating properties, the void 60 may be under a negative atmospheric pressure and may further contain an inert gas such as nitrogen ($N_2$), Argon or any other gas compatible with the material composition of the surrounding structures. Although liquid fuel in the present example, it is contemplated and understood that the fluid 62 may also be a gas, liquid such as oil and water, or even a solid material (e.g. powder) capable of flow. It is further understood that the term "tube" also refers to conduits, casings, pipes and other structures capable of fluid flow and/or encasement of a thermal insulating gas.

Such fuel nozzles 20 flowing liquid fuel and operating in hot environments like the plenum 32, where temperatures may exceed 1,700 degrees Fahrenheit (927 degrees Celsius), are susceptible to fuel varnishing and coking due to high temperatures of more traditional fluid bearing tube(s). This coking can lead to decreased flow capacity of the nozzle and decreased quality of fuel delivery. To manage the temperature of the tube 56 and thus the fluid or fuel 62 and prevent coking, the void 60 may be employed to substantially break the thermal conduction path from the hot external environment to the inner tube 56. It is further contemplated and understood that other portions of a fuel delivery system of the gas turbine engine may utilize the same type of assembly 20. For instance, the fuel manifold 50 may be susceptible to similar coking issues leading to unintentional mal-distribution of fuel in the system, and thus benefit from the same means of insulating a tube that bears fluid flow.

The inner and outer tubes 56, 58 may each have at least one respective bend 64, 66 that generally corresponds with the bend(s) 54 of the centerline 52 and such that the void 60 is generally maintained (i.e. spacing between tubes). The bends 64, 66 may be orientated where longitudinal insertion of the inner tube 56 into the outer tube 58 (and if the tubes were separate pieces) is difficult if not impossible. With such fitting difficulties, additive manufacturing the tubes 56, 58 generally together and/or simultaneously and as one unitary piece, is advantageous. Alternatively, each tube may have multiple bends along the centerline 52 that may be directed in different directions, this multiple bend configuration would also make fitting or insertion of the inner tube 56 into the outer tube 58 difficult, if not impossible, therefore, additive manufacturing the tubes simultaneously is advantageous.

The fuel nozzle 20 may include a plurality of support structures 68 in the insulating void 60 for properly locating the inner tube 56 with respect to the outer tube 58 at least during manufacture. Each support structure extends between the inner and outer tubes 56, 58 for contacting both tubes, and may be engaged (i.e. attached) to one of the tubes or both. The number and positioning of the support structures

68 are dictated by the size and shape of the fuel nozzle 20 and may be axially aligned and circumferentially spaced from one-another. Each support structure 68 may be a pylon, a foil, or a relatively thin sheet and may be manufactured of the same material of at least one of the tubes 56, 58. Alternatively or in addition thereto, the support structure 68 may have a greater porosity than either tube 56, 58 or may be made of a different material (e.g. ceramic) to reduce thermal conductivity between tubes.

Figure 3:
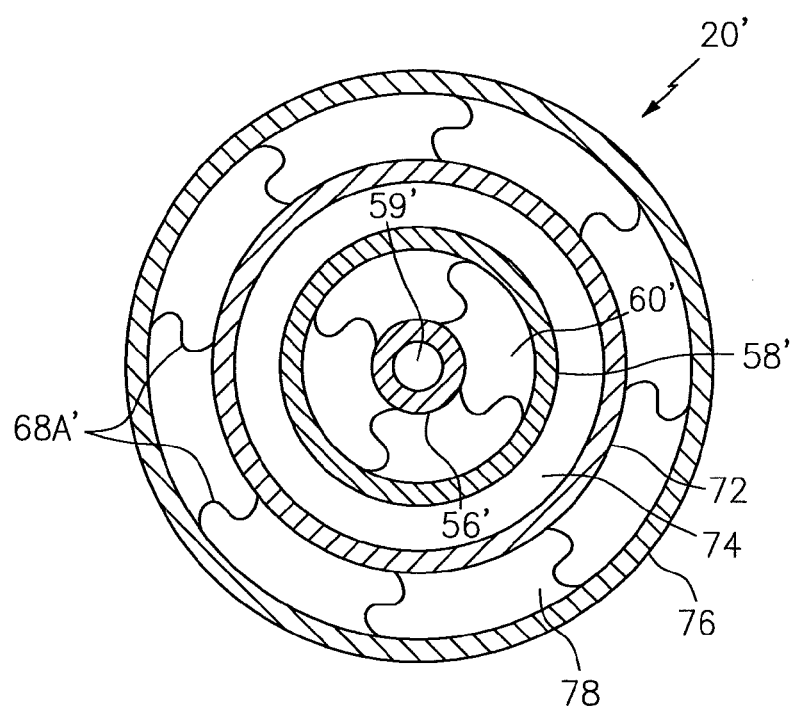
FIG. 3 is a cross section of a second embodiment of a tube assembly.

Whether the support structure 68 is a pylon, a thin sheet or some other form, the support structures 68 may include a support structure 68A with a bended or serpentine profile that has an overall length that is greater than a radial distance 70 between the inner and outer tubes 56, 58 (also see FIG. 3). That is, at least one of the support structures 68A may lie in an imaginary plane that is normal to the centerline 62 yet has a length that is greater than the radial distance 70 or thickness of the void 60. The support structures 68 may further include support structures 68B where each support structure 68B contacts both tubes 56, 58, but also extends in both an axial and radial direction, thereby having a length that is greater than the radial distance 70. Because the longitudinal lengths of the support structures 68A, 68B is longer than the proximate radial distance 70, thermal conduction through the structures 68A, 68B (e.g. heat transferred from the outer tube 58 to the inner tube 56) is reduced or minimized. Moreover, the engagement or contact area of each support structure 68 to one or both tubes 56, 58 (e.g. the outer tube 68 in the present nozzle example) is minimized to reduce thermal conduction while maintaining the structural needs of the assembly or nozzle 20.

Manufacturing of such a complex and intricate tube assembly 20 (with the support structures 68) may be simplified by applying an additive manufacturing process. The thickness or diameter of the support structure 68 may be as small as about 0.004 inches (0.102 millimeters) and/or the minimal production capability of the additive manufacturing process applied. The tube assembly 20, or portions thereof, may be additive manufactured as one unitary and homogenous piece. Material compositions include, but are not limited to, nickel (e.g. INCONEL 718, 625), Waspaloy® (of United Technologies Corporation), Stellite® (of the Deloro Stellite Company), titanium, steels and stainless steels, cobalt, chrome, Hastalloy® X (of Haynes International Corporation), and others.

Referring to FIG. 3, a second embodiment of a tube assembly is illustrated wherein like elements have like identifying numerals except with the addition of a prime symbol. The tube assembly 20' of the second embodiment has a flowpath path 59' defined by an inner tube 56'. A second tube 58' is spaced radially outward from the inner tube 56' with a substantially annular first void 60' defined there-between. A third tube 72 may be spaced radially outward from the second tube 58' with an annular second flowpath 74 defined there-between. A fourth tube 76 may be spaced radially outward from the third tube 72 with a substantially annular second void 78 defined there-between.

One or both of the voids 60', 78 may have thermal insulating properties and may contain a plurality of support structures 68' (e.g. structures 68A' illustrated). The flowpaths 59', 74 may flow the same or different fluids and in the same or opposite directions. For example, flowpath 59' may flow liquid fuel, and flowpath 74 may flow air or gas. It is further contemplated and understood that additional tubes may be added and the radial orientation of the voids with the flowpaths may be altered. Moreover, the outer or fourth tube 76 may not be generally tubular, but may take the form of an aerodynamic shape to complement flow around the exterior of the tube assembly; for example, flow in the plenum 32 (see FIG. 1).

Figure 4:
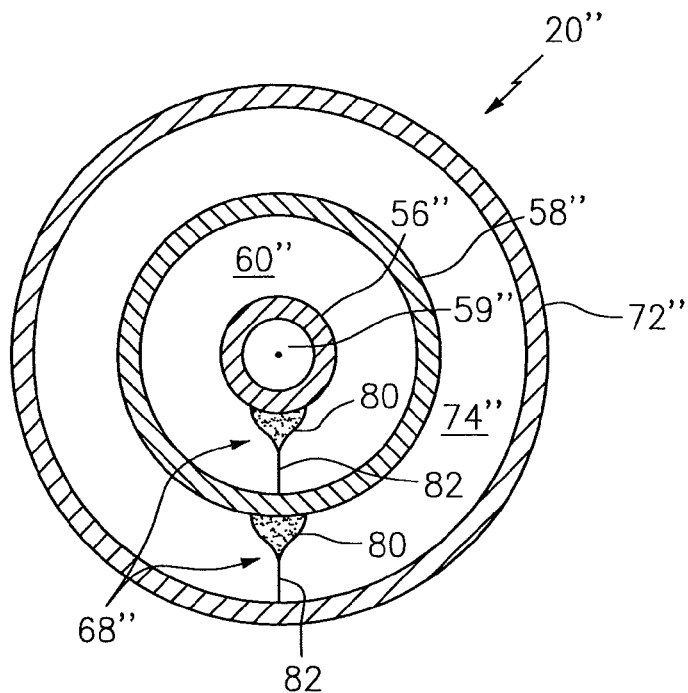
FIG. 4 is a cross section of a third embodiment of a tube assembly.

Referring to FIG. 4, a third embodiment of a tube assembly is illustrated wherein like elements have like identifying numerals except with the addition of a double prime symbol. The tube assembly 20" of the third embodiment has a flowpath path 59" defined by an inner tube 56". A second tube 58" is spaced radially outward from the inner tube 56" with a substantially annular first void 60" defined there-between. A third tube 72" may be spaced radially outward from the second tube 58" with an annular second flowpath 74" defined therebetween. The annular void 60" may flow a fluid or may serve as a thermal insulating layer. Similarly, the flowpath 74" may alternatively be an insulating void.

The tube assembly 20" may further include at least one sacrificial support structure 68" designed to break when placed under stress (e.g. stress created during normal operation of the assembly 20"), and thereby minimize or eliminate any thermal conduction between tubes. The sacrificial support structures 68" may be in one or both of the void 60" and the flowpath 74". Each structure 68" may have and extends between a base portion 80 and a breakable portion 82. The breakable portion 82 may be engaged to the tube that generally experiences the greatest thermal gradient. For instance and in the present example, the assembly 20" may be in a hot surrounding environment and it may be desired to keep the fluid flowing in flowpath 59" cool. In this thermal orientation, the breakable portion 82 of the structure 68" in the flowpath 74" may be engaged to the tube 72", and the breakable portion 82 of the structure 68" in the void 60" may be engaged to the tube 58". The thickness or diameter of the breakable portion 82 may be within the range of about 0.004 inches to about 0.008 inches (102 to 203 microns). As described before, such complex and intricate assemblies and/or structures may be additive manufactured.

Figure 5:
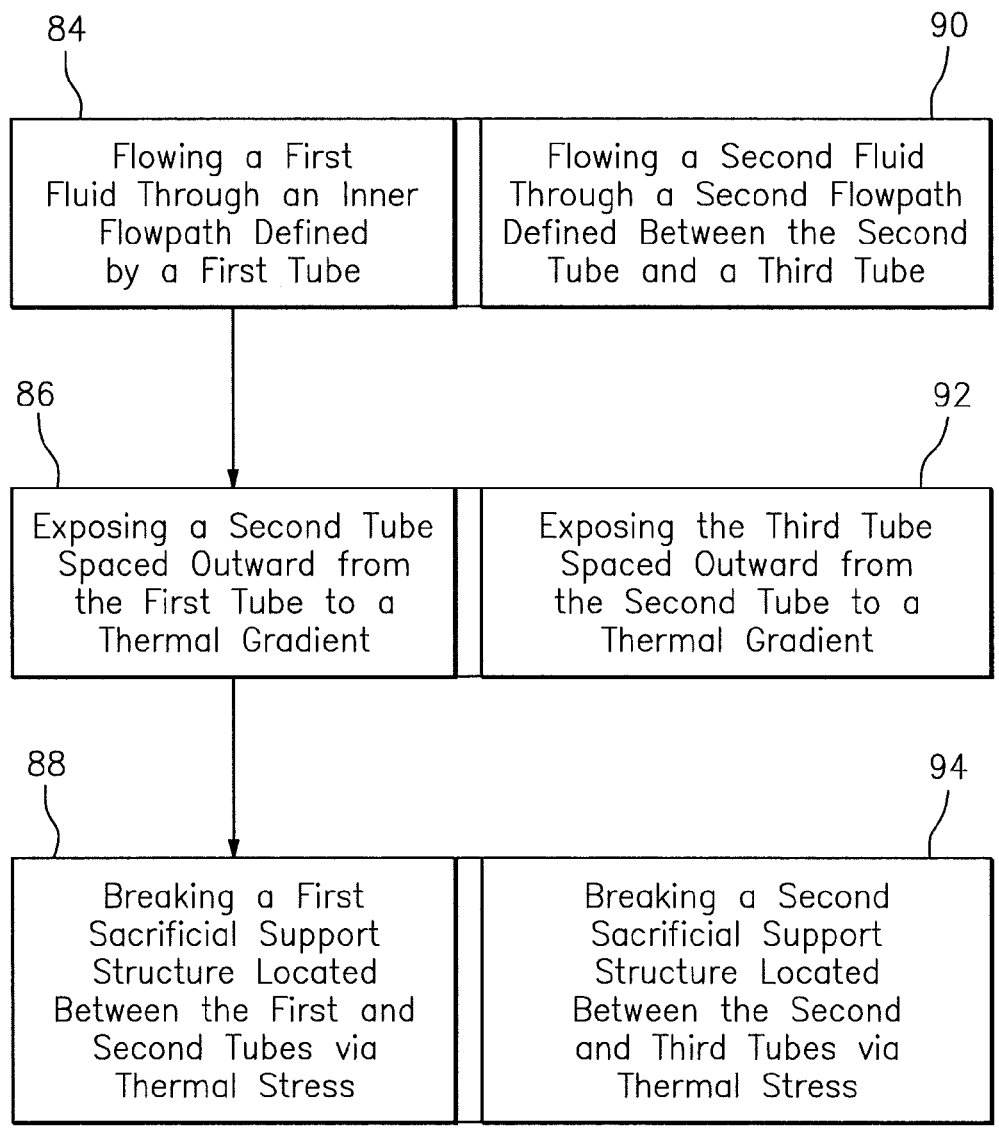
FIG. 5 is a flowchart of a method of operating the tube assembly.

Referring to FIG. 5, a method of operating a fuel nozzle 20" of a fuel system of a gas turbine engine (as one, non-limiting, example) may include an initial step 84 of flowing a first fluid through an inner flowpath 59". A next step 86 includes exposing the second tube 58" a first thermal gradient. A next step 88 may include breaking the first sacrificial support structure 86" located between the tubes 56", 58" via thermal stress induced by the first thermal gradient. A next step 90 may be simultaneous to step 84 and may include flowing a second fluid through the flowpath 74". A next step 92 may include exposing the third tube 72" to a thermal gradient. A next step 94 may include breaking a second sacrificial support structure 68" located between the second and third tubes 58", 72".

Examples of additive manufacturing processes include, but are not limited to, laser powder bed, electron beam melting, free form fabrication laser powder deposition and electron beam wire deposition, amongst others. Additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the workpiece, layer-by-layer. The principle behind additive manufacturing processes may involve the selective melting of atomized precursor powder beds by a directed energy source, producing the lithographic build-up of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. These devices are directed by three-dimensional geometry solid models developed in Computer Aided Design (CAD) software systems.

Figure 6:
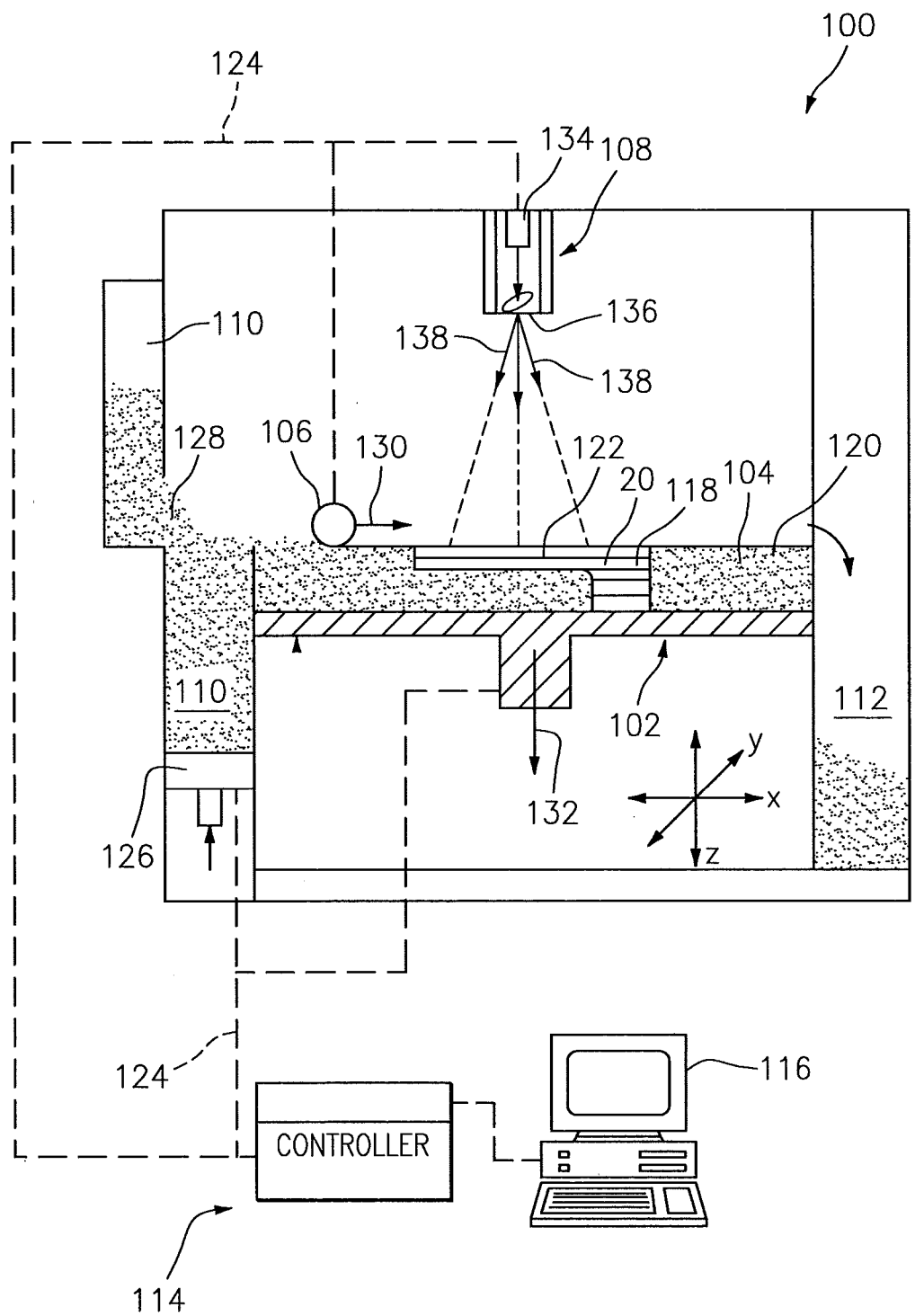
FIG. 6 is a schematic of an additive manufacturing system used to manufacture the tube assembly.

One example of an additive manufacturing system 100 capable of manufacturing the tube assembly 20 is schematically illustrated in FIG. 6. The additive manufacturing system 100 has a build table 102 for supporting the assembly 20 and generally holding a powder bed 104, a particle spreader, wiper or sprayer 106 for spreading, spraying or otherwise placing the powder bed 104 over the manufacture portion of the assembly 20 and build table 102, an energy gun 108 for selectively melting regions of a layer of the powder bed, a powder supply hopper 110 for supplying powder to the spreader 106, and a powder surplus hopper 112. The additive manufacturing system 100 may be constructed to build the assembly 20, or any portions thereof, in a layer-by-layer fashion. The powder bed 104 is composed of the same material composition as the assembly being additively manufactured.

A controller 114 of the additive manufacturing system 100 may include a computer 116 for entering data and that contains software for programming automated functions in accordance with inputted three dimensional computer aided design models of the assembly 20. The model may include a breakdown of the assembly 20 into a plurality of slices 118 additively built atop one-another generally in a vertical or z-coordinate direction. Each solidified slice 118 corresponds to a layer 120 of the powder bed 104 prior to solidification and each layer 120 is placed on top of a build surface 122 of the previously solidified slice 118. The controller 114 generally operates the entire system through a series of electrical and/or digital signals 124 sent to the system 100 components. For instance, the controller 114 may send a signal 124 to a mechanical piston 126 of the supply hopper 110 to push a supply powder 128 upward for receipt by the spreader 106. The spreader 106 may be a wiper, roller or other device that pushes (see arrow 130) or otherwise places the supply powder 128 over the build surface 122 of the assembly 20 (or any portion thereof) by a pre-determined thickness that may be established through downward movement (see arrow 132) of the build table 102 controlled by the controller 114. Any excess powder 128 may be pushed into the surplus hopper 112 by the spreader 106.

Once a substantially level powder layer 120 is established over the build surface 122, the controller 114 may send a signal 124 to the energy gun 108 that energizes a laser or electron beam device 134 and controls a directional mechanism 136 of the gun 108. The directional mechanism 136 may include a focusing lens that focuses a beam (see arrows 138) emitted from device 134 which, in-turn, may be deflected by an electromagnetic scanner or rotating mirror of the mechanism 136 so that the energy beam 138 selectively and controllably impinges upon selected regions of the top layer 120 of the powder bed 104. The beam 138 moves along the layer 120 melting region-by-regions of the layer 120 at a controlled rate and power, melting each region into pools that then form with, or sinter to, the adjacent build surface 122, solidify, and ultimately form the next top slice 118. The process then repeats itself where another powder layer 120 is spread over the last solidified slice 118 and the energy gun 108 melts at least a portion of that layer along with a meltback region (i.e. sintering) of the previously solidified slice 118 to form a uniform and homogeneous assembly 20, or portion thereof.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A tube assembly comprising:
    a first tube defining a first flowpath along a centerline;
    a second tube generally spaced radially outward from the first tube, and wherein a first void is located between and defined by the first and second tubes; and
    a first sacrificial support structure located in the first void and extending between the first and second tubes that is constructed and arranged to break when under normal operating stress thereby limiting thermal conduction between the first and second tubes.

2. The tube assembly set forth in claim 1, wherein the first tube, the second tube and the support structure are additive manufactured as one unitary piece.

3. The tube assembly set forth in claim 1, wherein the first void is an insulating void.

4. The tube assembly set forth in claim 3 further comprising:
    a third tube generally spaced radially outward from the second tube, and wherein a second flowpath is located between and defined by the third and second tubes.

5. The tube assembly set forth in claim 4 further comprising:
    a fourth tube generally spaced radially outward from the third tube, and wherein a second void is located between and defined by the fourth and third tubes.

6. The tube assembly set forth in claim 5 further comprising:
    a second sacrificial support structure located in the second void.

7. The tube assembly set forth in claim 6, wherein the second void is an insulating void.

8. The tube assembly set forth in claim 3, wherein the first void is under a negative atmospheric pressure.

9. The tube assembly set forth in claim 7, wherein the first and second cavities are under a negative atmospheric pressure.

10. The tube assembly set forth in claim 1, wherein the sacrificial support structure has a thickness within a range of 0.004 to 0.008 inches.

11. The tube assembly set forth in claim 4, further comprising:
    a second sacrificial support structure located in the second flowpath.

12. The tube assembly set forth in claim 1, wherein the tube assembly is at least part of a fuel nozzle for a gas turbine engine.

13. A tube assembly comprising:
   a first tube defining a first flowpath along a centerline;
   a second tube generally spaced radially outward from the first tube by a radial distance, and wherein a first void is located between and defined by the first and second tubes; and
   a first support structure located in the first void, and extending between and engaged to the first and second tubes,
   wherein the first support structure has a length greater than the radial distance, and
   wherein the first support structure lies in a plane that is normal to the centerline.

14. The tube assembly set forth in claim 13, wherein the first support structure is one of a plurality of first support structures spaced circumferentially from one-another.

15. The tube assembly set forth in claim 13, further comprising:
   a third tube generally spaced radially outward from the second tube, and wherein a second flowpath is located between and defined by the third and second tubes;
   a fourth tube generally spaced radially outward from the third tube, and wherein a second void is located between and defined by the fourth and third tubes; and
   a second support structure located in the second void.

16. The tube assembly set forth in claim 13, wherein the tube assembly is additive manufactured as one unitary piece.

17. The tube assembly set forth in claim 1, wherein the first sacrificial support structure is constructed and arranged to break via thermal stress induced by a thermal gradient imposed on the second tube.

\* \* \* \* \*

UNITED STATES PATENT AND TRADEMARK OFFICE
CERTIFICATE OF CORRECTION

PATENT NO. : 9,915,480 B2
APPLICATION NO. : 14/789496
DATED : March 13, 2018
INVENTOR(S) : Ott et al.

Page 1 of 1

It is certified that error appears in the above-identified patent and that said Letters Patent is hereby corrected as shown below:

On the Title Page

In the Abstract, Line 12, please delete "then al" and insert --thermal--.

Signed and Sealed this
First Day of May, 2018

Andrei Iancu
*Director of the United States Patent and Trademark Office*